United States Patent
Daley et al.

(10) Patent No.: US 12,254,438 B2
(45) Date of Patent: Mar. 18, 2025

(54) SAFEGUARDING HIGH VALUE ASSETS USING ARTIFICIAL INTELLIGENCE

(71) Applicant: INTERNATIONAL BUSINESS MACHINES CORPORATION, Armonk, NY (US)

(72) Inventors: Stan Kevin Daley, Espanola, NM (US); Jeremy R. Fox, Georgetown, TX (US); Michael Bender, Rye Brook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 4 days.

(21) Appl. No.: 17/816,454

(22) Filed: Aug. 1, 2022

(65) Prior Publication Data
US 2024/0037486 A1    Feb. 1, 2024

(51) Int. Cl.
*G06Q 10/083*    (2024.01)

(52) U.S. Cl.
CPC ................... *G06Q 10/083* (2013.01)

(58) Field of Classification Search
CPC ....... G06Q 10/083; G06Q 50/40; G06Q 50/60
See application file for complete search history.

(56) References Cited

U.S. PATENT DOCUMENTS

| | | | |
|---|---|---|---|
| 7,673,513 B2 | 3/2010 | Görtler et al. | |
| 7,769,221 B1 | 8/2010 | Shakes et al. | |
| 8,095,395 B2 | 1/2012 | Cunniff et al. | |
| 8,279,067 B2 | 10/2012 | Berger | |
| 8,786,407 B2 | 7/2014 | Liu | |
| 9,230,233 B1 | 1/2016 | Sundaresan et al. | |
| 9,248,611 B2 | 2/2016 | Divine et al. | |
| 9,648,446 B2 | 5/2017 | Neves et al. | |
| 10,416,280 B2 | 9/2019 | Meadow | |
| 10,605,674 B1* | 3/2020 | Holbrook | G01K 3/00 |
| 11,088,830 B2 | 8/2021 | Gu et al. | |
| 2006/0038684 A1* | 2/2006 | Lahiri | B65D 79/02 340/572.1 |
| 2007/0056369 A1 | 3/2007 | Griffin et al. | |
| 2018/0186543 A1* | 7/2018 | Shah | B65D 81/03 |
| 2018/0220278 A1 | 8/2018 | Tal | |
| 2019/0012639 A1 | 1/2019 | Boothman | |

(Continued)

OTHER PUBLICATIONS

Chang, Xinyue, Shipping Configuration Optimization with Topology-Based Guided Local Search for Irregular Shaped Shipments, Purdue University, May 2015.*

(Continued)

*Primary Examiner* — Nathan Erb
(74) *Attorney, Agent, or Firm* — Lily Neff

(57) ABSTRACT

A method, computer system, and a computer program product for securing transportation of Items. In one embodiment, packaging particulars may be determined including packaging configuration and materials. At least a sensor may be embedded when packaging the Item. The sensor type and location may be selected by a processor. The Sensor(s) may be selected to monitor changes to the condition of the Item during the transportation. Sensor data may be monitored and any risk to the Item during the transportation may be mitigated. In one embodiment, when a risk has been determined, an alert may be provided such as to a person or an IoT enabled device to mitigate the risk.

18 Claims, 8 Drawing Sheets

(56) References Cited

U.S. PATENT DOCUMENTS

| | | | |
|---|---|---|---|
| 2019/0180291 A1* | 6/2019 | Schmeling | G16H 20/10 |
| 2019/0258993 A1* | 8/2019 | Olsen | H04W 4/029 |
| 2020/0025795 A1* | 1/2020 | Mitchell | G01P 21/00 |
| 2022/0076091 A1* | 3/2022 | Volkerink | G06K 19/0717 |
| 2022/0101248 A1 | 3/2022 | Grant et al. | |
| 2022/0139518 A1* | 5/2022 | Shawver | G06Q 10/06312 |
| | | | 705/2 |

OTHER PUBLICATIONS

Author Unknown, "How AT&T helps track precious shipments in the belly of a plane," AT&T, Accessed: May 31, 2022, https://www.att.com/Investor/ATT_Annual/2014/att_cargo_view.html, 3 pages.

IBM, "IBM Sterling Solutions," IBM.com, Feb. 8, 2021 https://www.ibm.com/supply-chain/sterling, 1 page.

Mell et al., "The NIST Definition of Cloud Computing", National Institute of Standards and Technology, Special Publication 800-145, Sep. 2011, 7 pages.

Miller, "IBM-Maersk blockchain shipping consortium expands to include other major shipping companies", TechCrunch, published May 28, 2019 , https://techcrunch.com/2019/05/28/ibm-maersk-blockchain-shipping-consortium-expands-to-include-other-major-shipping-companies/, 2 pages.

TSI, "Shipping art safely and reliably," TSI Shipping, Accessed May 31, 2022, https://www.tsishipping.com/residential/art, 6 pages.

Vena et al., "Passive UHF RFID Sensor to Monitor Fragile Objects during Transportation", 2019 IEEE Int. Conf. on RFID Technology and Applications (RFID-TA), 2019, https://ieeexplore.ieee.org/document/8892033, pp. 415-420.

Wolfson, "Global shipping leaders join IBM and Maersk blockchain platform", Cointelegraph, Published Oct. 15, 2020, https://cointelegraph.com/news/global-shipping-leaders-join-ibm-and-maersk-blockchain-platform, 4 pages.

* cited by examiner

SAFEGUARDING HIGH VALUE ASSETS USING ARTIFICIAL INTELLIGENCE

BACKGROUND

The present invention relates generally to the field of data processing and more particularly to techniques for safeguarding assets during transportation using generated data.

The methods for the transportation of goods have evolved throughout history. Speed of transportation has increased enormously with the advent of technology. However, safe transport of goods provides challenges even with the new technology. With increased specialization and globalization, items tray be transported across the globe and routes have rapidly increased in distance. This poses difficulties in ascertaining the safety of the items that are being transported. Even with the transportation of regular items, the distance and fragility of the items may cause issues in safeguarding the condition of the item. Transportation of valuable assets or historical items present even greater challenges in this area.

There may be increased concern about damage sustained to the item due to transportation hazards such as constant vibration, effects of temperature changes and exposure to moisture, and other environmental factors. However, with valuable assets other concerns such as substituting a fake replacement and theft pose even greater challenges.

SUMMARY

Embodiments of the present invention disclose a method, computer system, and a computer program product for securing transportation of Items. In one embodiment, packaging particulars may be determined including packaging configuration and materials. At least a sensor may be embedded when packaging the Item. The sensor type and location may be selected by a processor. The Sensor(s) may be selected to monitor changes to the condition of the Item during the transportation. Sensor data may be monitored and any risk to the Item during the transportation may be mitigated. In one embodiment, when a risk has been determined, an alert may be provided such as to a person or an IoT enabled device to mitigate the risk.

BRIEF DESCRIPTION OF THE SEVERAL VIEWS OF THE DRAWINGS

These and other objects, features and advantages of the present invention will become apparent from the following detailed description of illustrative embodiments thereof, which may be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
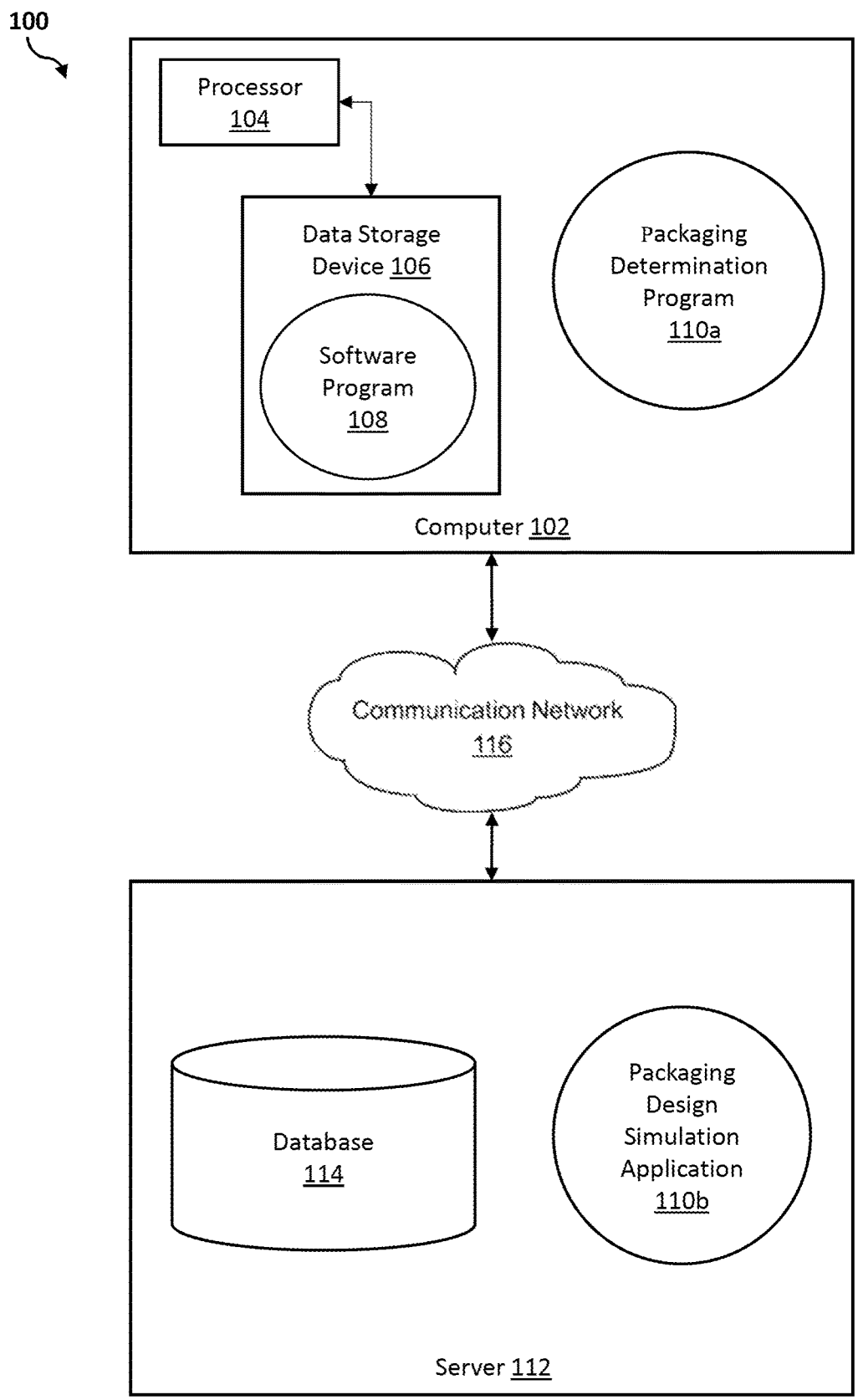
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but may not be limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to customize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and computer program product for secure transportation of Items. In one embodiment, packaging particulars may be determined including packaging configuration and materials. At least a sensor may be embedded when packaging the Item. The sensor type and location may be selected by a processor. The Sensor(s) may be selected to monitor changes to the condition of the Item during the transportation. Sensor data may be monitored and any risk to the Item during the transportation may be mitigated. In one embodiment, when a risk has been determined, an alert may be provided such as to a person or an IoT enabled device to mitigate the risk.

Referring to FIG. 1, an exemplary networked computer environment 100 in accordance with one embodiment may be depicted. The networked computer environment 100 may include a computer 102 with a processor 104 and a data storage device 106 that is enabled to run a software program 108 and a cookie management program 110. The networked computer environment 100 may also include a server 112 that is enabled to run a session authentication program 118 that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as an exclusive cloud, community cloud, public cloud, or hybrid cloud. Client computer 102 may be, for example, a mobile device, a telephone, a customized digital assistant, a netbook, a laptop computer, a tablet computer, a desktop computer, or any type of computing devices capable of running a program, accessing a network, and accessing a database 114. According to various implementations of the present embodiment, an Item packaging determination program 110a, and a document merging application 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the program/application 110a, 110b (respectively) to provide a user review submission and feature extraction technique. This technique will be provided in more detail below with respect to FIGS. 2 through 4.

Figure 2:
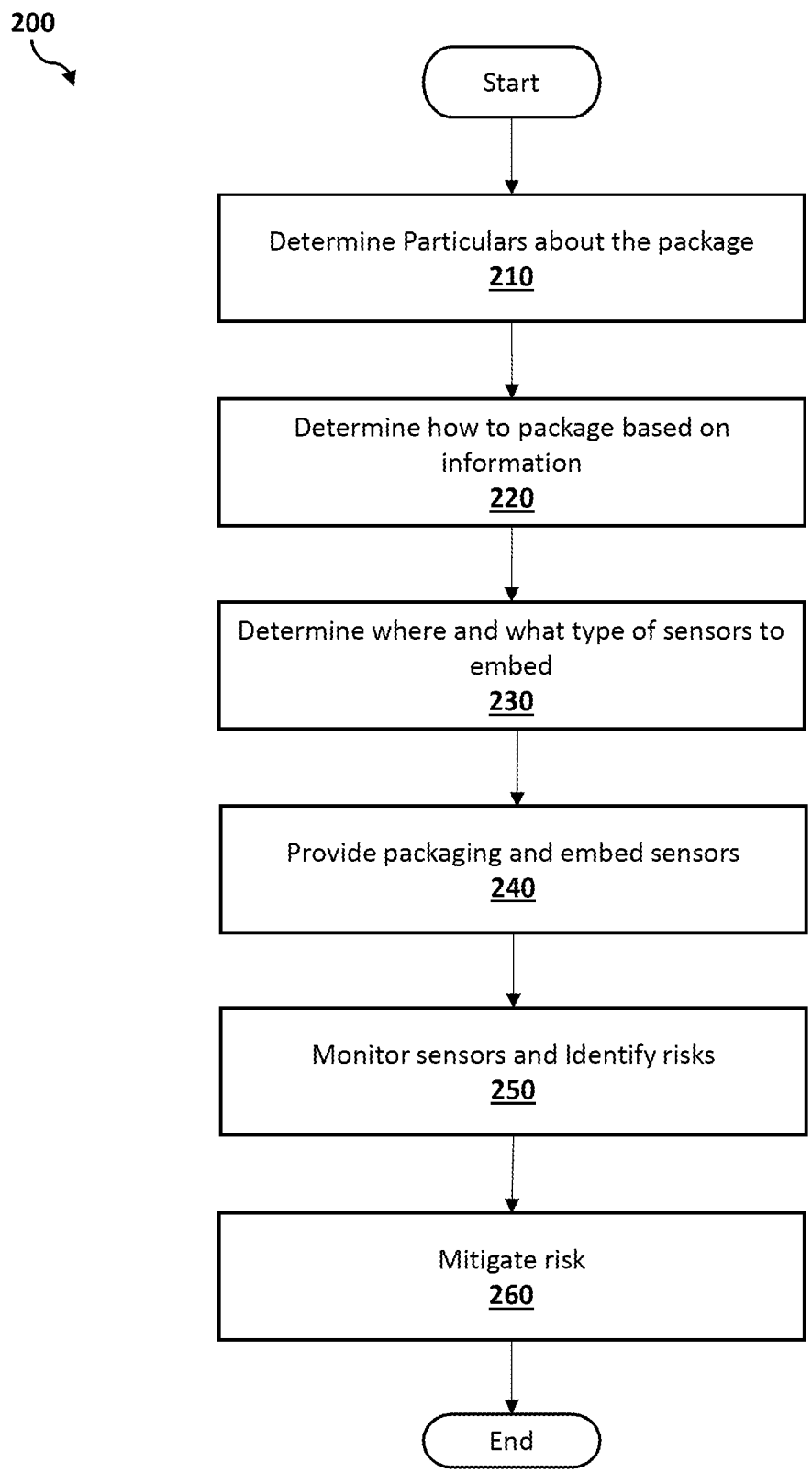
FIG. 2 provides an operational flowchart illustrating a method for securing transportation of at least an Item according to one embodiment.

Referring now to FIG. 2, a flowchart depiction is provided illustrating techniques to perform a process 200 to provide secure packaging and transportation of objects. In one embodiment, as will be discussed in further details in FIGS. 3a/b and 4, three dimensional (3D) printing and artificial intelligence (AI) can be used to make the process more efficient. In addition, Internet of Things (IoT) and IoT enabled devices can also be used to mitigate risks during the transportation process.

The process 200 starts in Step 210, where the packaging particulars are determined. In different embodiments, the packaging particulars can include determining packaging configuration and selecting best packaging materials to be used for transportation of an Item. As can be appreciated, in alternate embodiments this determination may be performed using different processes. For example, in one embodiment, the Item(s) can be scanned or photographed or measured. Additional information can also be ascertained as to the geometry and history of the Item's transportation. For example, a user may provide input relating to the Item and specifics of packaging it. In addition, historical information can be retrieved from one or more generalized sources or alternatively customized accounts relating to the transportation and securing of the Item during the transportation process. For example, previous information relating to the Item may relate to a previous issue in transportation of the particular Item or similar such items. Other information may relate to insurance instructions, contract instruction, import/export rules or other specifics that may relate to legal concerns or as relating to a particular insurance policy.

In Step 220, an assessment will be made in determining how to package the Item. This can include in one embodiment, the type of packaging materials to be used or how much protection and padding to be provided. In one embodiment, the packaging can be handled through a three-dimensional printer (3D) and related printed materials. The material selection may depend on a variety of factors as may be appreciated by those skilled in the art. For example, the geometrical shape of the Item, its physical state (such as liquid or solid), its material composition strength, and vibration tolerance of the Item (material composition) can be determined and considered when selecting materials for its packaging.

The information in Steps 210 and 220 create a corpus for the packaging of the Item as will be discussed in FIGS. 3a and 3b. In one embodiment as will be discussed in relation to FIG. 3b, information determined in these steps can be provided to a database. The database includes other relevant information, including historical data, that can help in security of the item during packaging and transportation. The information in the database may be useful, especially in transportation of fragile or valuable items. This information can be based on similar items previously transported or be specific to the actual Item and its previous history.

In different embodiments, creating a corpus for the current Item may include taking pictures and/or scans of the item (especially important for artwork, high end electronics, jewelry etc.) and/or entering metadata for each piece. It may also include retrieving information from one or more public locations about the item or about packaging availability (package can be sent via U.S. postal service or other carrier service etc.). As mentioned, any historical data available about previous shipping or breakage of this or additional item is also obtained. In one embodiment, for certain items, a simulated or even a dry run transport can be completed to see how a clone of the item responded to a trial run/simulation.

In Step 230, one or more sensors are selected for embedding in the packaging. In one embodiment, the type, number of sensors, and their placement can be determined via a processor. The sensor selection can be performed at the same time, or alternatively prior or subsequent to the selection of packaging material. Sensor selection may include consideration as to security and/or environmental changes that may occur during transportation to the Item. The type of transportation can be considered during sensor selection. For example, a motion sensor may be required if the Item will be exposed to constant vibration due to the type of transportation vehicle. Another sensor may be needed if the Item can be damaged because of exposure to humidity or moisture. A temperature sensor may be needed if there are thresholds of heat/cold that need to be monitored to ensure the integrity of the Item. One or more sensors may be needed to be incorporated that are of the same or different types.

Determining the placement and type of sensors may also be added or obtained from previously stored information in the corpus related data prepared for the Item. This information may include types of sensors required to monitor environmental conditions for a particular Item relating to past history, mode of transport or legal or insurance purposes. The size and/or geometry o the item may also determine the number and positioning of the sensor(s). (AI can also be used in this determination). In addition, as will be discussed in relation to FIG. 3a, in one embodiment, simulations using all possible permutations may be crated and analyzed until an acceptable threshold has been reached.

In Step 240, the packaging may then be prepared for subsequent enclosure of the Item. In one embodiment, the packaging may be selected utilizing metadata and previously provided corpus (either historically or in other steps) for the item. In one embodiment, different options may be provided for possible packaging selection. An optimal selection may then be made (automatically or by a user) among the different options presented. All required sensors will be embedded and placed appropriately. Sensors may be placed on or near the Item as provided earlier (such as through the image scan). In one embodiment, a 3D printer may be used to print the packaging and for embedding of the sensors within the 3D printed packaging materials. As will be later discussed in conjunction with FIG. 4, the packaging material available for 3D printing may be selected from a variety of available materials.

In Step 250, the packaged Item may be prepared and sensor tracking enabled. In one embodiment, sensor access (e.g. address) is shared digitally with a processor or a system (at least one process) that will monitor the condition of the Item during its transport.

Once the item is in transit or placed appropriately, the sensor data is continuously monitored. In one embodiment, the monitoring is based on sensor data transmitted from the sensors embedded within the 3D printed packaging materials, the package while in transit, wherein the monitoring includes package security, package integrity, and package environmental conditions.

In Step 260, any risks are identified according to several factors that can affect the transit of the item. These risks may be dependent upon changes based on the monitoring of the sensors, or they may arise based on external factors that were not pre-existing. For example, an approaching turbulent weather pattern, a catastrophic environmental event ahead on a road, a political or social issue and the like may pose a risk to the Item. Changes in the condition of the Item can also be measured and mitigated. The mitigation may include a range of solutions such as communicating with the transportation carrier, interacting with an Internet of Things (IoT) enabled device or informing the authorities in case of possible theft. Other avenues for risk mitigation may include informing an owner or insurer of the package. In one embodiment a history of the design and/or a history of the transportation of the Item can then be recorded and stored in the corpus database for later use.

Figure 3A:
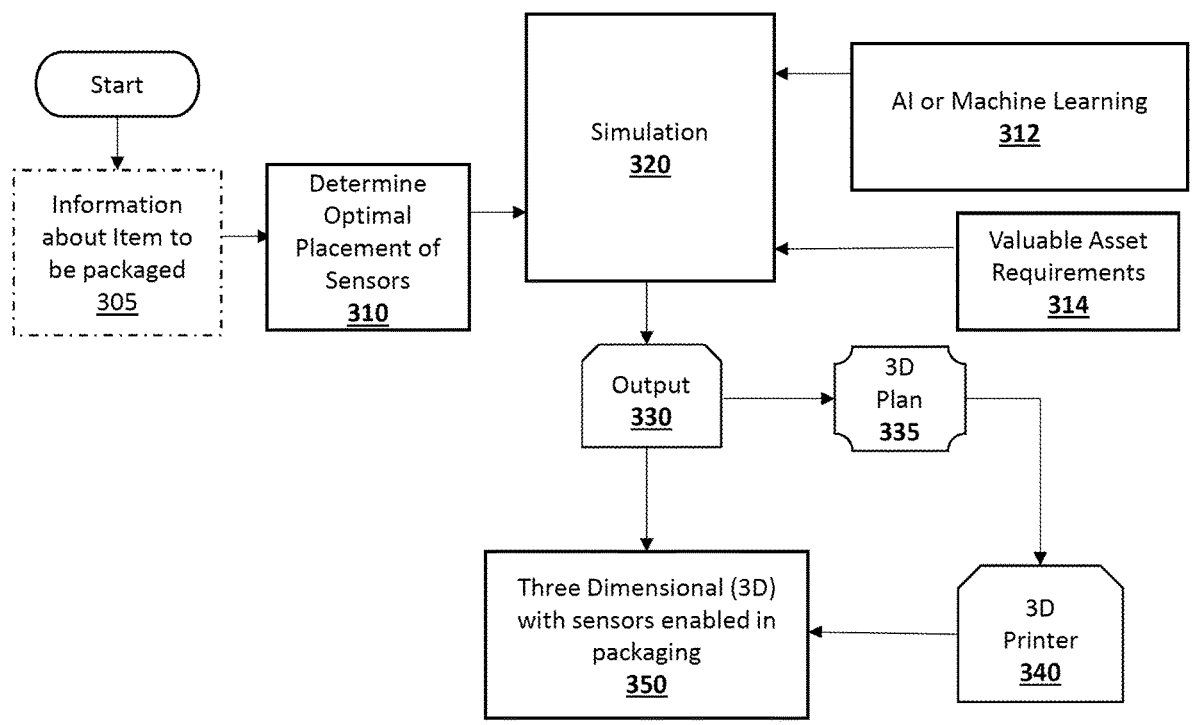
FIGS. 3a and 3b are complementary processes that further provide details about the embodiment of FIG. 2, with FIG. 3a providing details about the packaging of the Item and FIG. 3b providing details about the monitoring of the Item.
Figure 3B:
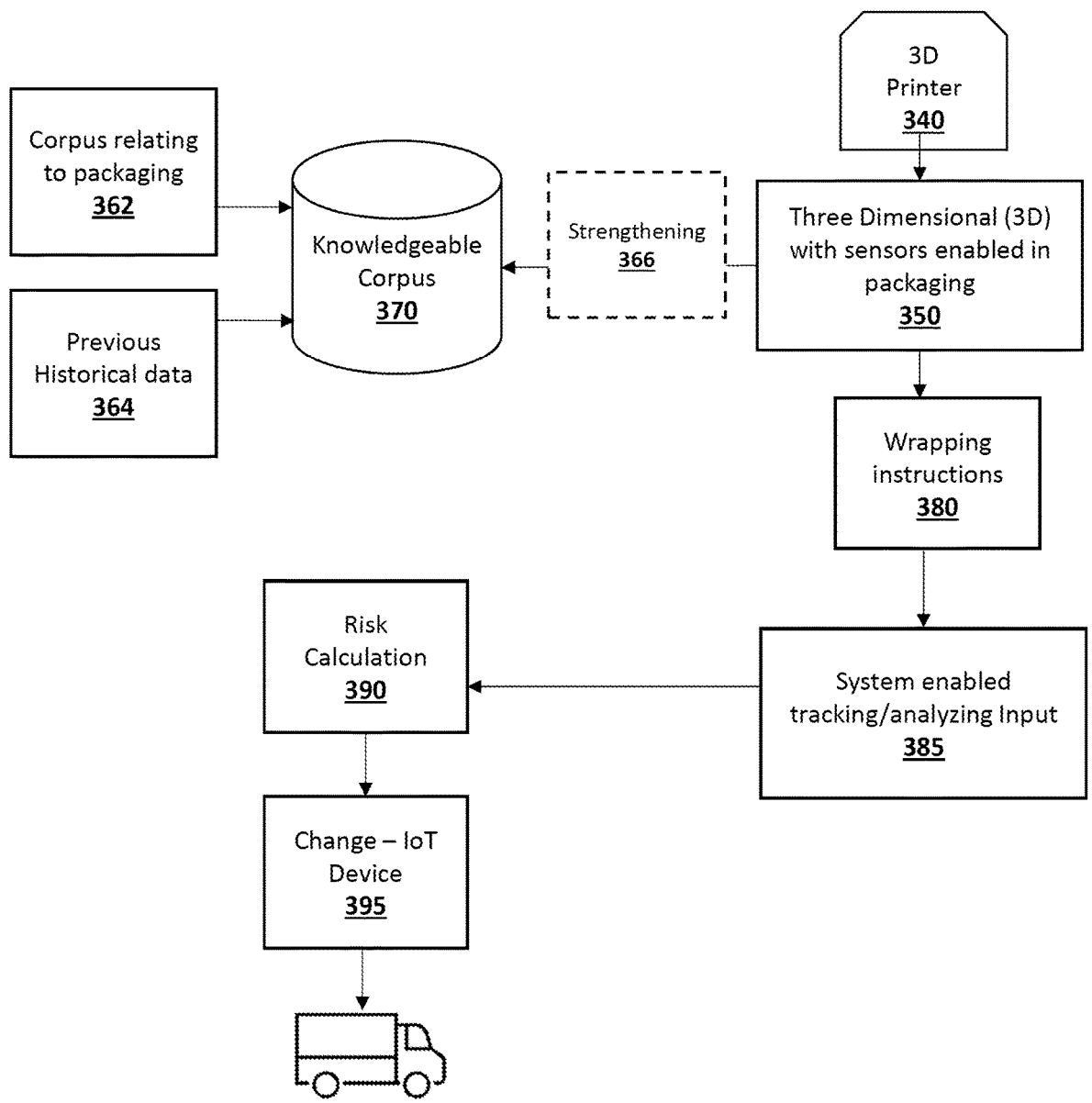

FIGS. 3a and 3b are complementary processes that further provide details about the embodiment as discussed in FIG. 2. In FIG. 3a, the process commences with determining the configuration of the item 305 (Steps 210 and 220 in FIG. 2) and the determination of the placement of sensors as shown at 310 (Step 230 in FIG. 2). As will be discussed later in connection with FIG. 3b, a knowledge corpus 370 can be used that includes information about the Item including its historical data. In FIG. 3b, it is shown that information is being submitted to this storage 370 but some information, when available, can be also accessed in the commencement to the process as shown at 305. However, the information about the Item can partially or entirely be obtained from other sources such as through user input or by scanning the object (or pictorially or through metadata etc. as can be appreciated.) The determination of sensor placement and information about the item can be processed, in one embodiment for example, by a program like the Item packaging determination program of 110a as discussed. Once these items are obtained, they can then be provided to a simulator or simulation module 320 (similar to the packaging design simulation application 110b). In one embodiment, as illustrated, an Artificial Intelligence (AI) or Machine Learning component 312 can be used to provide information to the simulation component 320. The AI can be progressively trained to obtain information in future procedures. In addition, valuable asset information and/or requirement 314 that has not already been provided to the system at 305 can be provided. This requirement 314 can include a range of legal and physical information ranging from insurance requirements to PIN information to VINs. The simulation module 20 generates all possible permutations of acceptable sensor and packaging related thresholds and will use it later for monitoring or in choosing an optimal package configuration.

The simulation module 320 then uses the information and provides an output 330 that will be used to generate a 3D plan 335 in on embodiment where a 3D printer 340 may be provided for the packaging. Where a 3D printer may be not be provided, other modules and components can be used to select and obtain or manufacture the packaging material as can be appreciated. The process corresponds to Step 230 of FIG. 2.

The sensors may be provided as part of the packaging as printed by the 3D printer and embedded in the packaging or be subsequently added as shown at 350. The components and Steps 340 and 350 can be steps a singular step in some embodiments. These steps correspond to Step 240 of FIG. 2.

FIG. 3b provides more details about the steps that occur once the requirement for the packaging may be determined. For one, the information may be provided and stored in a (Knowledgeable) Corpus database 370 as was discussed earlier. The (Knowledgeable) Corpus database 370 also includes any information related to a precious asset (art for example), or related material that might have been determined by a particular geography (including a country), or as pertaining to import/export rules or postage. This information can also include details as inputted by a user (or an entity) and include additional historical data from previous transports of the same or similar objects (or as pertaining to a geography and or a particular user and/or entity.) Any information that can strengthen future procedures 366 will then be added (can include asset value requirements for example or other novel concepts provided by the AI).

In Step 380, the packaging information may be reviewed, and any further wrapping instructions can be provided. In one embodiment, several layers of packaging may be used or necessary. In one embodiment, after a first layer of packaging has been used, the partially packaged item may be then scanned again for analysis. This previous step can be iterative if secondary scans are recommended after each layer of packaging. In one embodiment, a material list of available packaging materials may also be provided at different stages to a human user or even a robot/device.

In one embodiment, material selection will be provided based on the following criteria:
  Artificial Intelligence (AI) Infusion based on the shape, known materials strength, and the triangulation to the vibration tolerance.
  Shape, Size, Weight, =Yielding and 3D printing and additional dampening requirements.
  Packing material(s) condensed over time and are reduced in size.
  Constant Vibration (some vibration over time) and/or maximum vibration (package was dropped) may be tracked as a factor. Packing materials may be condensed over time and gravity may break highly fragile items.
  (Example—Fine art for sculptures and highly breakable pieces).
  Additional layers added as determined based on corpus analysis and further materials selection.

In one embodiment, a person or a robot/device can be used to wrap the item as per instructions.

Once the Item has been wrapped, sensor tracking of the item may be enabled. In one embodiment, a system, that at least may be comprised of a processor, will then receive and analyze the input that will be received from the embedded sensors and data from other sources. In one embodiment, the location sensors may be triangulated to determine relative placement as well prior or during the activation process.

Step 390 includes two components. The first component may be the tracking and analyzing of the input being received from a variety of inputs including the sensors. If the sensor thresholds as was provided earlier by the simulator module 320 may be close to be triggered or has been triggered, then an alert may be provided. Other information that can affect the transport may be provided by other external sources. Some examples of these were discussed earlier and may include environmental feedbacks.

The second part of Step 390 includes the risk calculation, such as by a processor. This is a continuous process in light of the information received from the sensors and other relevant sources. The risk calculation may be include analyzing several such as environmental feedbacks and threshold management in one embodiment, where a threshold may have been established for each sensor (threshold value indicates operating in normal mode), data received from each sensor may be compared to the previously set or determined threshold. As suggested earlier, other information that includes an anticipation/prediction of a conditional change (environmental disasters, forecasted conditions and historical reactions etc.) may be included in risk assessment. In one embodiment, the assessment of the risk will then be considered, and a determination is made as to the level of the risk. If the level will likely compromise the Item (relative sense in location or sensors, threshold, developing events etc.), then steps will be taken to mitigate the risk. These actions will vary and depend situationally upon the risk.

For example, in one embodiment a smart IoT device can be used to change the environment (reroute the transport vehicle, turn on an air conditioner etc.) or additional steps may be required to address the issue. In one embodiment, the system may alert a transporter to intervene if conditions are to be compromised or cannot be changed such as via the IoT when one may be used in another embodiment, a particular person/user or even an entity in charge of the transportation (395) can be alerted as way of notification or to remedy a particular situation. This corresponds to Step 260 of FIG. 2. module 350 applies. In one embodiment, when the packaging has been determined to be compromised (even initially in relation to the change in location of sensors), a system alert may be provided. In situations where the item may be of value, the system alert may be sent to authorities to alert them that intervention may be required as a particular situation has occurred or may be about to occur.

Figure 4:
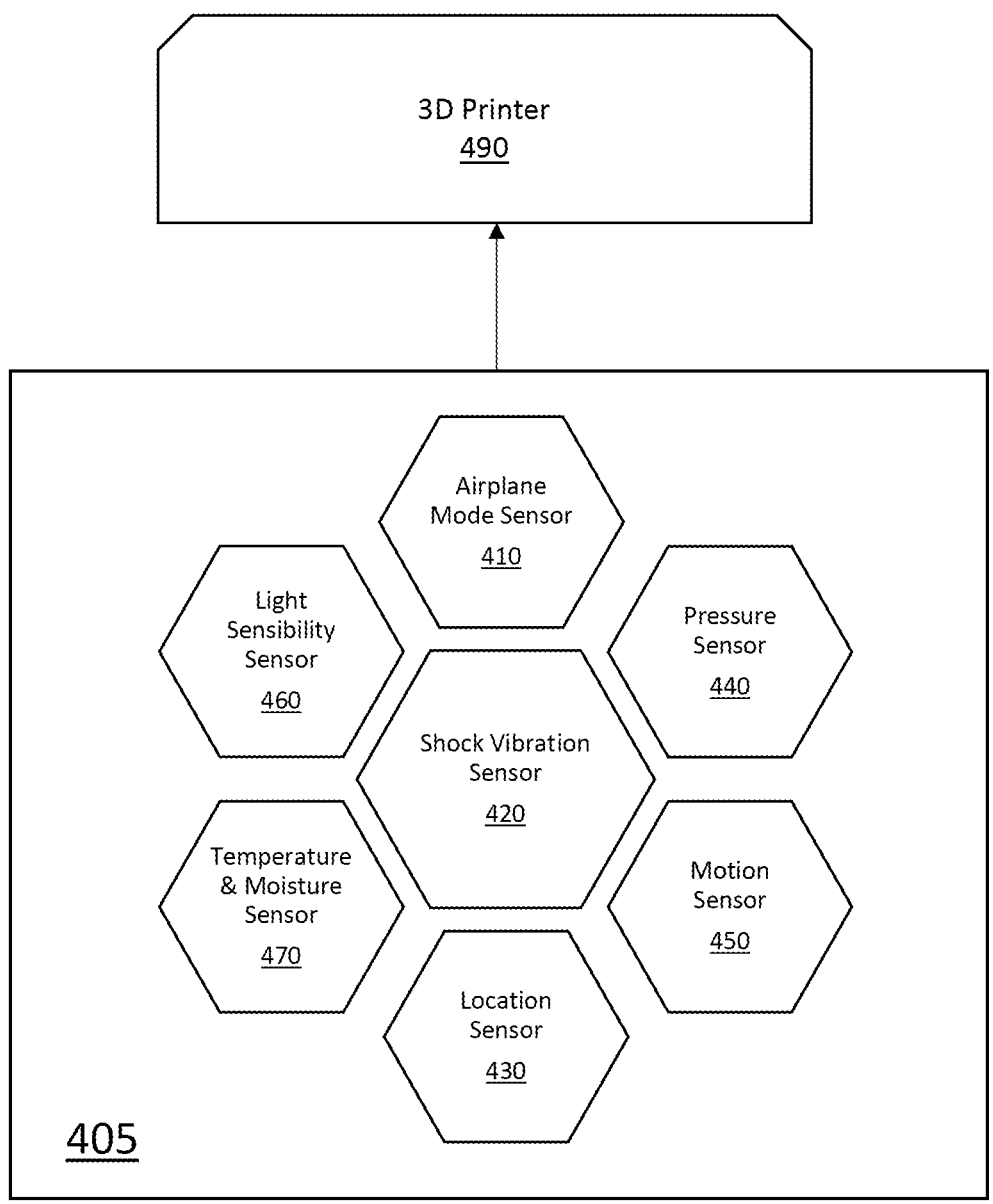
FIG. 4 provides some examples of sensors that may be selected for monitoring according to one embodiment.

FIG. 4 provides an illustration of some sensors and materials that can be considered while designing or 3D printing the packaging. The 3D printer 490 can embed a variety of sensors 405. As provided the sensors 410 to 470 each address different needs. The sensors 410 to 470 provide airplane mode sensors 410, pressure sensors 440, shock vibration sensors 420, motion sensors 450, location sensors 430, light sensitivity sensors 460, and temperature and moisture sensors 470. In one embodiment, availability of these sensors may be assessed beforehand so that if one may be not available for incorporation a similar sensor with similar functionality can be incorporated instead.

Figure 5:
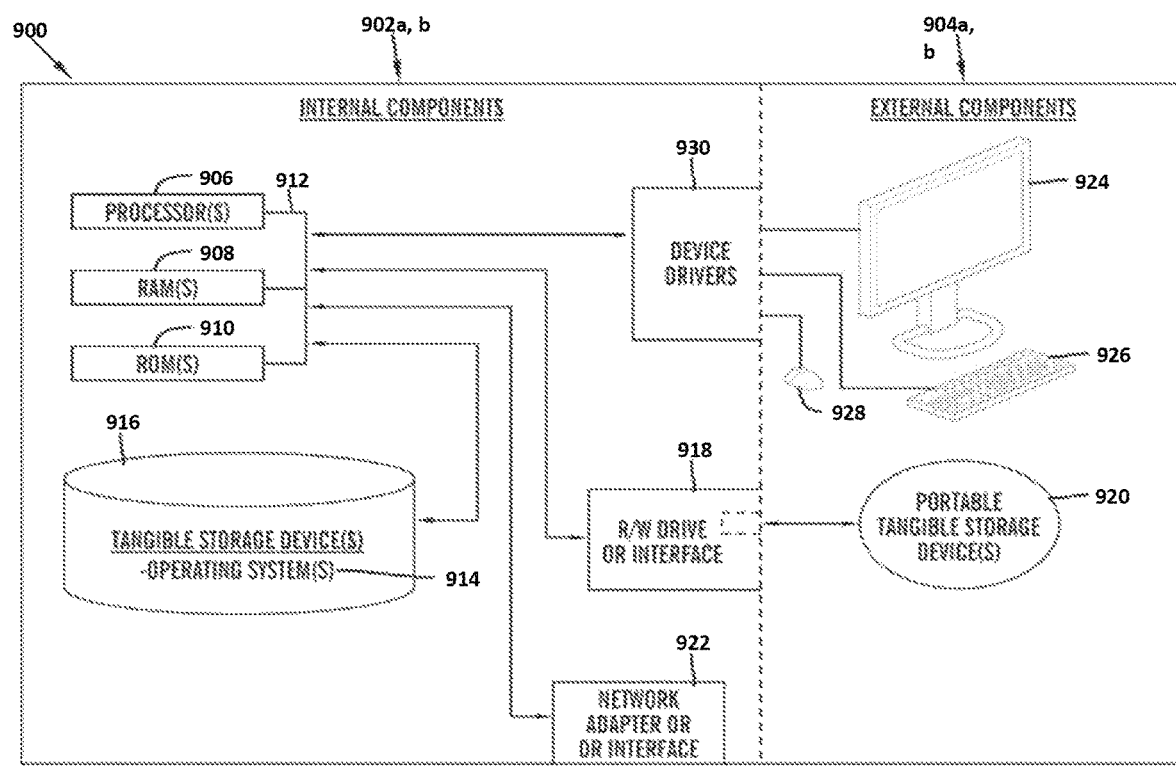
FIG. 5 provides a block diagram of internal and external components of computers and servers depicted in FIG. 1 according to at least one embodiment.
Figure 7:
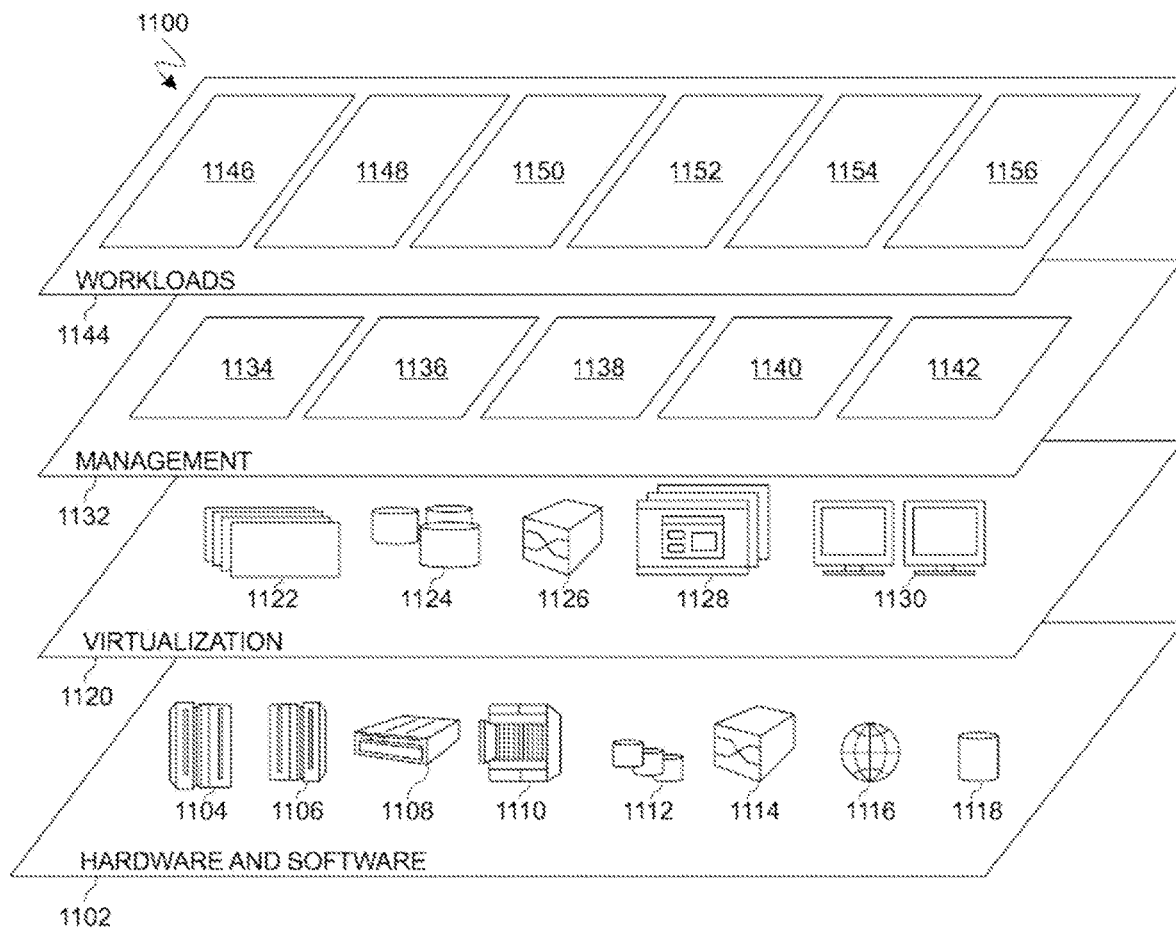
FIG. 7 provides a block diagram of functional layers of the illustrative cloud computing environment of FIG. 6, in accordance with an embodiment.

FIG. 5 provides a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 may be representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but may not be limited to, individual computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 7. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the Item packaging determination program 110a in client computer 102, and the packaging design simulation application 110b in network server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 may be a magnetic disk storage device of an internal hard drive. Alternatively, each of the computer-readable tangible storage devices 916 may be a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108, the Item packaging determination program 110a and the packaging design simulation application 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the 110a in client computer 102 and the packaging design simulation application 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the Item packaging determination program 110a in client computer 102 and the packaging design simulation application 110b in network server computer 112 may be loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It should be understood in advance that although this disclosure includes a detailed description on cloud computing, implementation of the teachings recited herein may not be limited to a cloud computing environment. Rather, embodiments of the present invention may be capable of being implemented in conjunction with any other type of computing environment now known or later developed.

Cloud computing provides a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may be as follows:

On-demand self-service: a cloud consumer can unilaterally provision computing capabilities, such as server time and network storage, as needed automatically without requiring human interaction with the service's provider.

Broad network access: capabilities may be available over a network and accessed through standard mechanisms that promote use by heterogeneous thin or thick client platforms (e.g., mobile phones, laptops, and PDAs).

Resource pooling: the provider's computing resources may be pooled to serve multiple consumers using a multi-tenant model, with different physical and virtual resources dynamically assigned and reassigned according to demand. There may be a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models may be as follows:

Software as a Service (SaaS): the capability provided to the consumer may be able to use the provider's applications running on a cloud infrastructure. The applications may be accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer may be deployed onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer may be to provision processing, storage, networks, and other fundamental computing resources where the consumer may be able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models may be as follows:

Customized and Individual cloud: the cloud infrastructure may be operated solely for an organization. It may be managed by the organization or a third party and may exist on-premises or off-premises.

Community cloud: the cloud infrastructure may be shared by several organizations and supports a specific community that has shared concerns (e.g., mission, security requirements, policy, and compliance considerations). It may be managed by the organizations or a third party and may exist on-premises or off-premises.

Public cloud: the cloud infrastructure may be made available to the general public or a large industry group and may be owned by an organization selling cloud services.

Hybrid cloud: the cloud infrastructure may be a composition of two or more clouds (customized and individual, community, or public) that remain unique entities but may be bound together by standardized or proprietary technology that enables data and application portability (e.g., cloud bursting for load-balancing between clouds).

A cloud computing environment may be a service oriented with a focus on statelessness, low coupling, modularity, and semantic interoperability. At the heart of cloud computing may be an infrastructure comprising a network of interconnected nodes.

Figure 6:
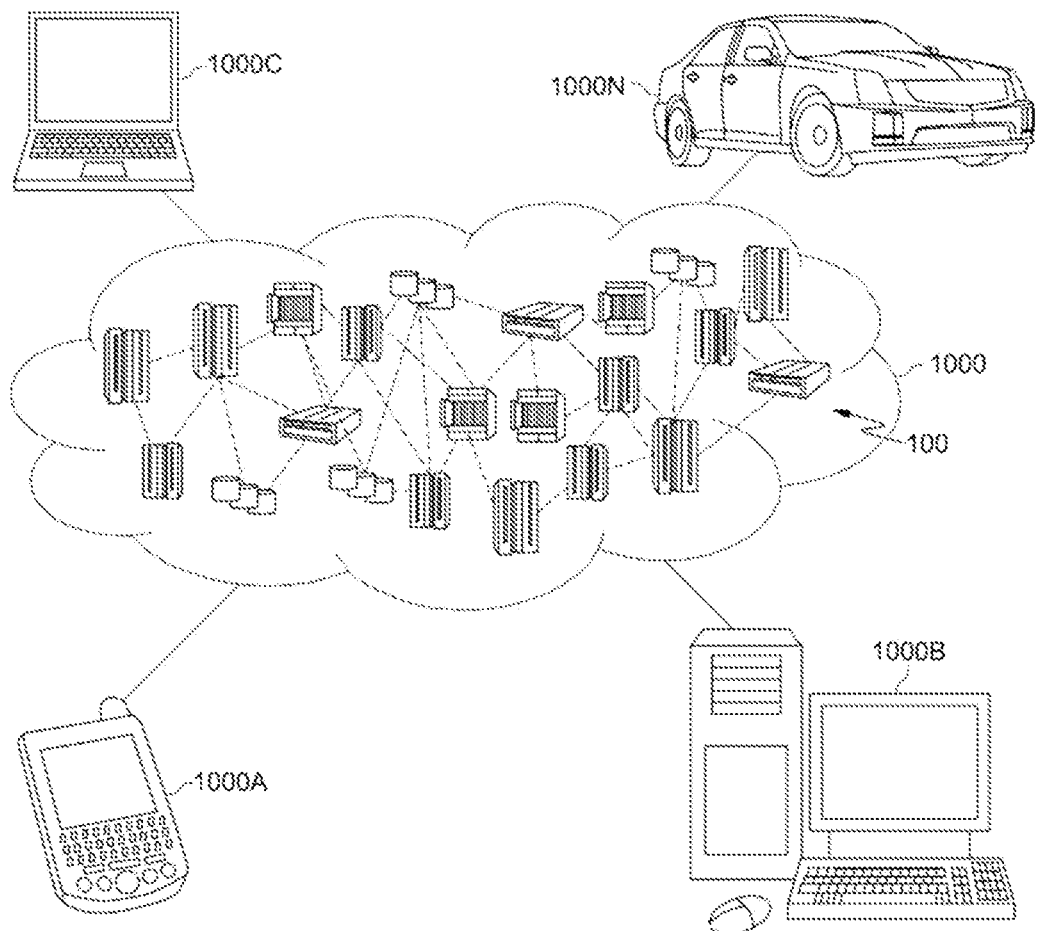
FIG. 6 provides a block diagram of an illustrative cloud computing environment including the computer system depicted in FIG. 1, in accordance with one embodiment.

Referring now to FIG. 6, illustrative cloud computing environment 1000 may be depicted. As shown, cloud computing environment 1000 comprises one or more cloud computing nodes 100 with which local computing devices used by cloud consumers, such as, for example, digital assistants (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as exclusive, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It may be understood that the types of computing devices 1000A-N shown in FIG. 5 may be intended to be illustrative only and that computing nodes 100 and cloud computing environment 1000 can communicate with any type of computerized device over any type of network and/or network addressable connection (e.g., using a web browser).

Referring now to FIG. 7, a set of functional abstraction layers 1100 provided by cloud computing environment 1000 has been shown. It should be understood in advance that the components, layers, and functions shown in FIG. 6 may be intended to be illustrative only and embodiments of the invention may be not limited thereto. As depicted, the following layers and corresponding functions may be provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual exclusive networks; virtual applications and operating systems 1128; and virtual clients 1130.

In one example, management layer 1132 may provide the functions described below. Resource provisioning 1134 provides dynamic procurement of computing resources and other resources that may be utilized to perform tasks within the cloud computing environment. Metering and Pricing 1136 provide cost tracking as resources may be utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels may be met. Service Level Agreement (SLA) planning and fulfillment 1142 provide pre-arrangement for, and procurement of, cloud computing resources for which a future requirement may be anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and data management 1156.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for secure transportation of items comprising:
    providing packaging for an item prior to its transportation by determining packaging particulars needed including packaging configuration and packaging material, wherein determining packaging particulars of said item includes selection of packaging materials based at least on said item's shape, material composition strength, and said item's vibration tolerance during its transportation;
    embedding at least one sensor in said packaging, wherein said at least one sensor's type and location is selected by a processor to monitor changes of condition to said item during its transportation;
    calculating a risk factor by analyzing any factors that may impact transportation based on current and historical predictions during said transportation of the item and by monitoring sensor data received during said transportation; and
    sending, to an Internet enabled device, an alert to mitigate any risks.

2. The method of claim 1, wherein an alert is provided when a risk has been determined after analyzing said sensor data.

3. The method of claim 2, wherein said Internet enabled device is an Internet of Things (IoT) enabled device that receives said alert and provides another device or person a corresponding alert.

4. The method of claim 1, wherein data relating to transportation of similar items or historical data about transportation of said same item is considered prior to determining packaging particulars and sensor selection.

5. The method of claim 1, wherein said sensors are selected responsive to a value and composition of said item and in response to a mode of transportation of said item.

6. The method of claim 1, wherein said sensor is selected to monitor any security and/or environmental risks to said item.

7. The method of claim 6, wherein said sensors include at least one of an airplane mode sensor, a pressure sensor, a shock vibration sensor, a motion sensor, a location sensor, a light sensitivity sensor, and a temperature and moisture sensor.

8. The method of claim 1, wherein said packaging particulars are provided to a three-dimensional (3D) printer for providing packaging for said item.

9. The method of claim 1, wherein said packaging can include a plurality of wrapping layers of the same or different materials.

10. The method of claim 1, further comprising:
    obtaining instructions relating to packaging of said item; said instructions including any additional sensors that need to be provided in said packaging.

11. A computer system for data processing, comprising:
    one or more processors, one or more computer-readable memories, one or more computer-readable tangible storage medium, and program instructions stored on at least one of the one or more tangible storage medium for execution by at least one of the one or more processors, via at least one of the one or more memories, to cause the computer system to perform a method comprising:
        automatically causing providing of packaging for an item prior to its transportation, comprising determining packaging particulars needed including packaging configuration and packaging material, wherein determining packaging particulars of said item includes selection of packaging materials based at least on said item's shape, material composition strength, and said item's vibration tolerance during its transportation;

automatically causing embedding of at least one sensor in said packaging, wherein said at least one sensor's type and location is selected by the at least one of the one or more processors to monitor changes of condition to said item during its transportation;

calculating a risk factor by analyzing any factors that may impact transportation based on current and historical predictions during said transportation of the item and by monitoring sensor data received during said transportation; and sending, to an Internet enabled device, an alert to mitigate any risks.

12. The computer system of claim 11, wherein an alert is provided when a risk has been determined after analyzing said sensor data.

13. The computer system of claim 11, wherein said Internet enabled device is an Internet of Things (IoT) enabled device that receives said alert and provides another device or person a corresponding alert.

14. The computer system of claim 11, wherein data relating to transportation of similar items or historical data about transportation of said same item is considered prior to determining packaging particulars and sensor selection.

15. The computer system of claim 11, wherein said packaging particulars are provided to a three-dimensional (3D) printer for providing packaging for said item.

16. A computer program product for data processing, comprising:
one or more non-transitory computer-readable storage medium and program instructions stored on at least one of the one or more non-transitory computer-readable storage medium, the program instructions executable by a processor, to perform a method comprising:

automatically causing providing of packaging for an item prior to its transportation, comprising determining packaging particulars needed including packaging configuration and packaging material, wherein determining packaging particulars of said item includes selection of packaging materials based at least on said item's shape, material composition strength, and said item's vibration tolerance during its transportation;

automatically causing embedding of at least one sensor in said packaging, wherein said at least one sensor's type and location is selected by the processor to monitor changes of condition to said item during its transportation;

calculating a risk factor by analyzing any factors that may impact transportation based on current and historical predictions during said transportation of the item and by monitoring sensor data received during said transportation; and sending, to an Internet enabled device, an alert to mitigate any risks.

17. The computer program product of claim 16, wherein an alert is provided when a risk has been determined after analyzing said sensor data.

18. The computer program product of claim 16, wherein said Internet enabled device is an Internet of Things (IoT) enabled device that receives said alert and provides another device or person a corresponding alert.

* * * * *